Feb. 10, 1953 J. J. BLACK 2,628,126
TWO-WHEEL DUMP TRAILER
Filed March 18, 1948 4 Sheets-Sheet 2

INVENTOR.
James J. Black
BY
Wood, Arey, Herron & Evans
ATTORNEYS

Feb. 10, 1953 — J. J. BLACK — 2,628,126
TWO-WHEEL DUMP TRAILER
Filed March 18, 1948 — 4 Sheets-Sheet 3

INVENTOR.
James J. Black
BY
Wood, Arey, Herron & Evans
ATTORNEYS

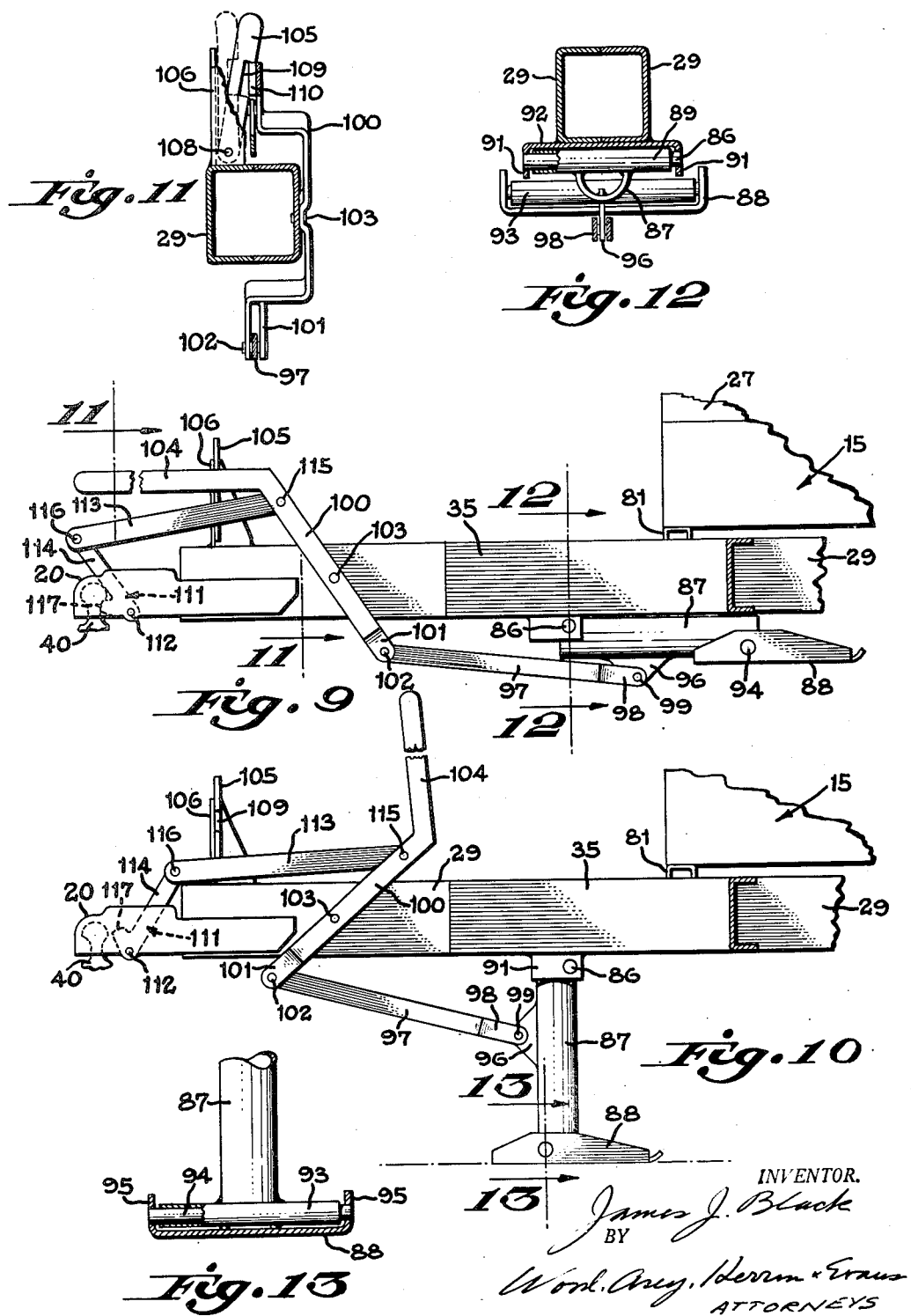

Patented Feb. 10, 1953

2,628,126

UNITED STATES PATENT OFFICE 2,628,126

TWO-WHEEL DUMP TRAILER

James J. Black, Cincinnati, Ohio, assignor, by mesne assignments, to Trailmobile Inc., a corporation of Delaware Application March 18, 1948, Serial No. 15,687

4 Claims. (Cl. 298—5)

This invention relates to trailers of the two-wheel type, that is, the type which is adapted to be supported at the front end by the towing vehicle or tractor. In this type of trailer, the front end of the trailer is supported by a retractable prop when uncoupled from the towing vehicle.

More particularly, the present invention relates to a trailer of the type which includes provision for dumping by elevation of the front end of the trailer, whereby the trailer is inclined to dump the contents from the rear end thereof. Trailers of this specific type are of great utility, for example, on farms for carrying and distributing fertilizer, this use, of course, being only one of many to which the trailer can be put. This type of trailer must be relatively inexpensive and of simplified construction.

Also, it is highly desirable that some power means be provided for raising the front end of the trailer free of its connection with the coupling pin of the tractor. In other words, the weight of the front of the trailer, when loaded, in most cases, would make it impossible or difficult for the operator to lift the front end of the trailer from coupled position and further the lowering of the prop would be difficult to accomplish while the front end of the trailer was being held in raised position.

Accordingly, it has been the object of the present inventor to provide a tractor-trailer combination of the character described, wherein a coupling frame is associated with the trailer and adapted to be coupled with the tractor and in conjunction with this coupling frame a hoist means is incorporated effective for dumping the trailer at the option of the operator. The hoist may be operated by air or hydraulics supplied from the tractor through a flexible coupling.

More specifically, it has been the object to provide a hoisting arrangement for dumping the trailer which is connected to the coupling frame and front end of the trailer in such manner as to pivot the trailer relative to the coupling frame, and due to the location of the pivotal connection between the trailer frame and the coupling frame, to produce an increased dumping angle by means of a hoist of relatively limited movement. In other words, the coupling frame is coupled to the trailer frame closer to the front of the trailer than to the back, and due to triangulation, this arrangement increases the dumping angle beyond the stroke of the hoist. If the coupling frame were attached, let us say, to the rear axle of the trailer, and the dumping hoist arranged in the same manner as it is in this structure, it would be necessary to have a hoist having an impractical stroke. Such a hoist would extend to a considerable height above the vehicles and would be in the way. In the present apparatus, the pivotal point between the coupling frame and trailer frame swings upwardly so that the increase in dumping angle is a result of both inclination of the coupling frame and the trailer frame. As the hoist tends to spread apart the front of the trailer and an intermediate point of the coupling frame, a sharp dumping angle is achieved.

It has been a still further object of the present inventor to provide a prop on the coupling frame that is adjustable relative thereto from inactive to active positions. In the active position, where the prop supports the trailer at the front end, the coupling end of the coupling frame will of necessity be raised above the coupling pin on the tractor. Therefore, a novel structure has been developed for uncoupling the front end of the trailer due to the fact that the portion of the coupling frame carrying the prop is raised higher from the ground as the hoist is operated for raising the front end of the trailer. With the front end of the trailer in raised position, the prop is free to be dropped to its supporting position and assuming the coupling to be in released position, the result of lowering the front end of the trailer will be to cause the prop to engage the ground and to cause the coupling frame to rock on the prop, its front end moving free of and clearing the coupling pin. Thus, uncoupling is accomplished by applying the weight of the front end of the trailer to the pivoted rear end of the coupling frame, thereby rocking the coupling frame out of coupling position.

It has been a still further object of the present inventor to provide an improved prop construction in this combination which is readily moved from retracted to supporting position.

A still further object has been to provide a prop construction which includes an actuating mechanism operable from the driver's seat of the tractor, whereby the prop may be lowered from the driver's seat. In this same objective, the inventor has provided a means associated with the prop actuating lever which will unlatch the coupling from the coupling pin in order to permit the coupling to move freely upwardly from position supported on the pin.

Other objects relate to the general construction of the apparatus whereby it is simplified and durable and accomplishes the above purposes with the minimum number of parts, and this object along with others will be more fully apparent from the following description of the drawings in which:

Figure 9 is a fragmentary side view of the front end of a trailer showing a modified form of prop mechanism mounted on the coupling frame, the view showing the prop retracted.

Figure 10 is a view taken similar to Figure 9, but showing the prop in position supporting the front end of the trailer.

Figure 11 is a sectional view taken on line 11—11, Figure 9, showing the actuating means for the prop and illustrating the latch mechanism for controlling the actuating mechanism.

Figure 12 is a sectional view taken on line 12—12, Figure 9, detailing the connection of the prop to the coupling frame.

Figure 13 is a sectional view taken on line 13—13, Figure 10, illustrating the skid member or base at the bottom of the prop.

Figure 1:
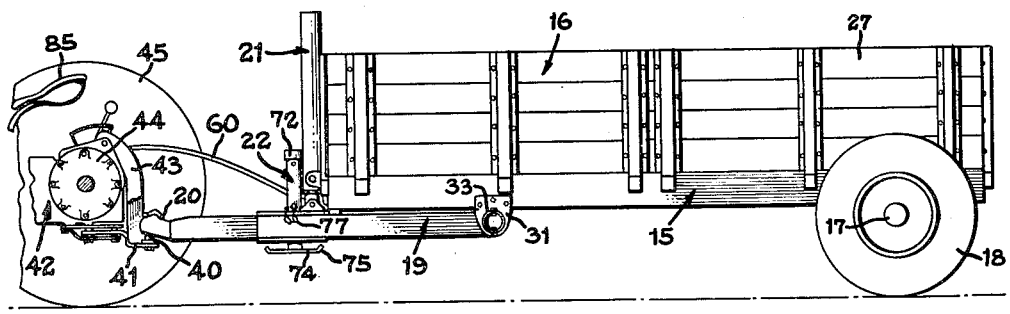
Figure 1 is a side view of the two-wheeled dump trailer of this invention, showing it coupled to and supported on the rear end of a tractor.

Generally speaking, the present apparatus consists of a main trailer frame 15 which carries a trailer body 16 and includes an axle 17 at its rear end, and wheels 18. A coupling frame 19 is pivotally attached to the body about one-fourth to one-third of the way back from the front of the body. The forward end of the coupling frame includes a coupler 20. The trailer is dumped by means of a hydraulic piston and cylinder device 21 connected between an intermediate point on the coupling frame and the front of the trailer. A prop 22 is provided on the coupling frame.

Figure 4:
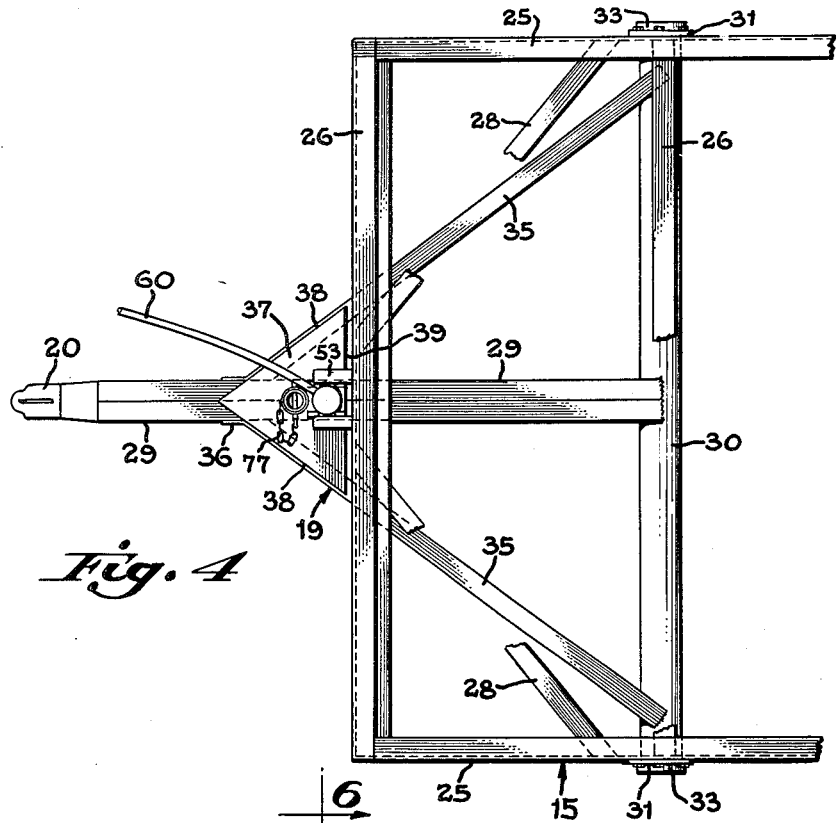
Figure 4 is a fragmentary top plan view of the trailer framework and the coupler mechanism at the front end of the trailer.

Referring more specifically to the details, as shown in the embodiment illustrated, the trailer frame 15 includes (Figure 4) side rails 25 and cross rails 26 which may be disposed, in addition to the front and back, across intermediate points of the frame. These rails, as shown, are of channel iron structure. The details of the axle and wheel mounting at the rear end of the trailer are not shown. Any standard mounting may be utilized. The trailer body 16 also may be of any desired form suitable to the purpose of the user. In the present instance, side and end walls 27 are employed to make up a cart or wagon for hauling fertilizer. The frame of the trailer may include diagonally mounted brace members 28 at the corners.

Figure 6:
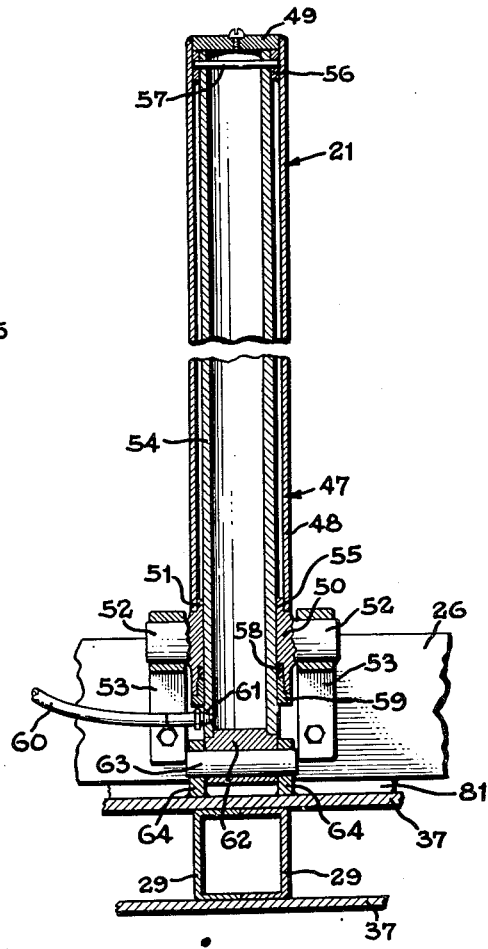
Figure 6 is a sectional view taken on line 6—6, Figure 5, detailing the fluid operated piston and cylinder mechanism for dumping the trailer.
Figure 8:
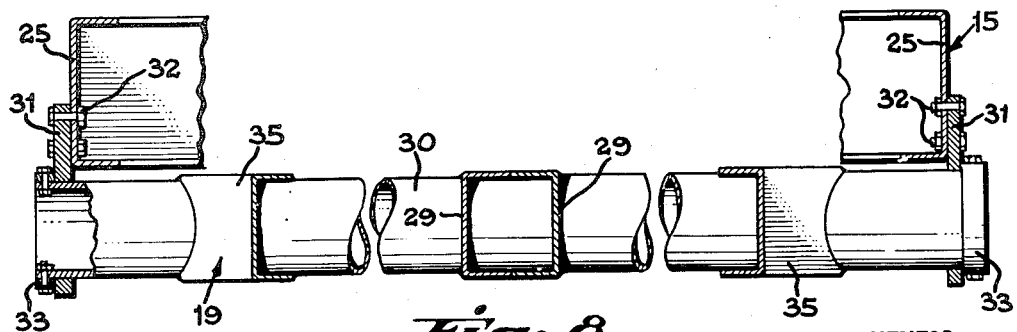
Figure 8 is a fragmentary sectional view taken on line 8—8, Figure 5, detailing the pivotal connection of the coupling frame to the trailer body.

The coupling frame 19 is made up of a central or longitudinally disposed tongue member 29 formed from sheet metal in the form of a square tube (Figures 6 and 8). This longitudinally disposed central tongue or beam 29 has its rear end formed and welded for attachment to a tubular pivot member 30 as shown in Figure 8. The tubular pivot member 30 has its respective ends supported in hanger brackets 31—31 and these are attached to the side rails 25 of the frame by means of bolts 32. Axial movement or displacement of the pivot tube is prevented by means of metal collars 33 bolted or otherwise secured on the extreme ends of the pivot tube on the outsides of the respective brackets and in abutment therewith. The location of this pivot rod relative to the length of the trailer frame is optional within prescribed limits. As shown, it is somewhat between one-fourth and one-third of the way back from the front end of the trailer. Its location is of importance in the function of the dumping apparatus as will be more fully apparent in the description which follows.

The tongue or central member of the coupling member or frame is braced by means of diagonally disposed brace members 35 having their rear ends welded to the pivot tube and their forward ends welded to the tongue adjacent each other but beyond the front end of the trailer frame. These braces 35 are formed of channel beams as shown. The base flanges of the beams are turned at an angle as shown at 36 (Figure 4) to provide additional points of attachment to the tongue. Gusset plates 37 of triangular form are welded to the tops and bottoms of the tongue and the respective braces. The side edges 38 of these gusset plates are parallel with the side edges of the diagonal braces and their rear edges 39 are spaced so as to clear the forward cross rail 26 of the trailer frame.

The forward end of the coupling frame includes the coupler 20 adapted to fit over and engage upon the spherical coupling pin 40 projecting upwardly from an extension 41 on the rear end of the tractor generally indicated at 42. It is not believed necessary to describe the tractor since it may be of any standard design modified to provide for towing the trailers of the type described herein. The extension 41 may be additionally supported by means of hanger straps or bars 43 extending down from the rear transmission casing 44 of the tractor. The rear wheels of the tractor are shown at 45. The hitch or coupling means is of the type that is uncoupled by raising the coupling device above and clear of the coupling pin. The coupling frame 19, as constituted by the arrangement of elements thus described, in addition to performing a coupling function, also serves as the mounting for the prop and as a leverage means utilized in connection with the dumping function of the trailer.

As illustrated in detail in Figure 6, the hoisting device or fluid operated device 21 couples the front of the trailer to an intermediate point of the coupling frame. Specifically described, the cylinder 47 of the piston and cylinder unit which make up the dumping or hoisting means, has its lower end pivotally mounted on the front end of the trailer. The cylinder is made up of a tube 48, the upper end of which is closed by means of a circular plug or cap member 49 held in place by welding. At the lower end of the cylinder, a bearing member 50 is provided having a counter-turned portion 51 welded in place in the lower end of the cylinder tube 48. This bearing member includes trunnions 52—52 extended diametrically from opposite sides of the bearing units. These trunnions are supported in brackets 53—53 fixed to the front cross member 26 of the trailer frame.

The piston 54 is telescopically mounted in the cylinder 21 traversing a bore 55 of the lower bearing member. This piston is hollow, being formed of a tube. It is spaced from the cylinder by virture of its bearing mounting in the lower bearing member and accordingly, its upper end is spaced by means of a spacer sleeve 56 held in position on the piston by means of a pin 57 disposed diametrically through the parts. A packing gland 58 is disposed in the lower bearing member 50 within a counter-bore thereof and a nut 59 holds the gland in position. Air is introduced into the lower end of the piston by means of an air delivery tube 60 extending from a point of supply on the rear end of the tractor, the tube being quickly, conveniently detachable therefrom. A fitting 61 secures the air delivery tube at the lower end of the piston. The lower end of the piston includes a mounting element 62 secured thereto by welding. A pin 63 pivotally mounts the lower end of the piston in spaced lugs 64 welded to the top of the gusset plate 37. A suitable control may be included on the tractor for admitting the air and controlling its release as desired.

Figure 2:
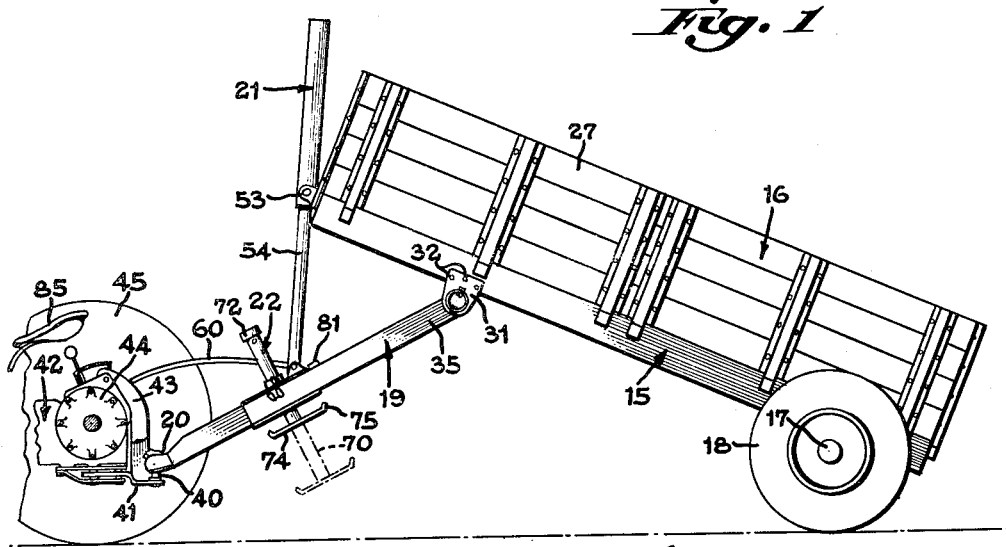
Figure 2 is a side view taken similar to Figure 1, but showing the trailer actuated to dumping position.

Thus as air is admitted to the piston, it is effective for translating the cylinder on the piston and separating the forward end of the trailer from the coupling frame. This movement is effective for two purposes. Generally speaking, it is also used in the uncoupling operation which may be part of the dumping operation depending upon the use of the trailer at the time. In the dumping operation, the trailer is moved to the position shown in Figure 2. In other words, the full stroke of the piston and cylinder is utilized, the spacer sleeve then coming into engagement with the lower bearing 50 and constituting a stop for limiting the operation of the piston. The articulating movement thus brought about is effective for inclining the trailer to a dumping angle. Due to the effects of triangulation, the dumping angle is increased well beyond the stroke of the pneumatic hoist. In other words, the closer the pivotal point of the coupling frame to the front of the trailer, the greater will be the dumping angle achieved. Naturally, the leverage is decreased and more air pressure is required when the pivotal point is closer to the front of the trailer.

The effect of operation of the air cylinder and piston is to separate the trailer body and the coupling frame at the points of connection to the hoist. As the trailer frame moves up, the rear end of the coupling frame moves up likewise and thus the elevating movement is multiplied. This multiplication of the dumping angle will be appreciated if one were to consider the coupling frame as pivotally attached to the rear axle of the trailer, in which event, very little elevation could be achieved unless the cylinder and piston were of impractical length. It will be apparent from Figure 2 that the intermediate portion of the coupling frame is elevated as the hoisting action takes place. This fact permits another advantage and this is with respect to uncoupling. In this connection it will be noted that the prop 22 is mounted adjacent the pivotal connection of the piston to the coupling frame, being just forward thereof.

The prop consists of a tubular leg 70 (Figure 7) slidably mounted in a bearing bushing or sleeve 71 welded in bores in the gusset plates 37. The sleeve projects above and below the gusset plates and its ends constitute stops for limiting the adjustment of the prop and the sleeve. The upper end of the prop carries a collar 72 fixed thereto by means of a bolt 73, this collar constituting the abutment means engaging the upper end of the bearing sleeve to limit lowering movement of the prop. The lower end of the prop carries a foot or skid element 74 which consists of a plate having its front and rear ends inclined slightly as at 75—75. A latch pin 76 is secured to the upper gusset of the plate by means of a chain 77 and is insertable through diametric bores 78 in the bushing 71 for alternate engagement with the upper or lower bores 79 and 80 respectively drilled diametrically through the leg portion of the prop. Thus, the prop may be fastened in either upper or lower position.

Figure 3:
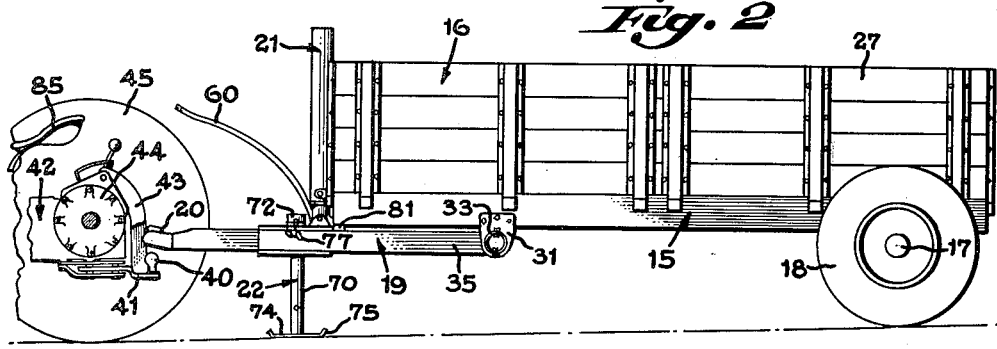
Figure 3 is a view taken similar to Figure 1, but showing the trailer uncoupled and having its front end supported by a prop mechanism.
Figure 7:
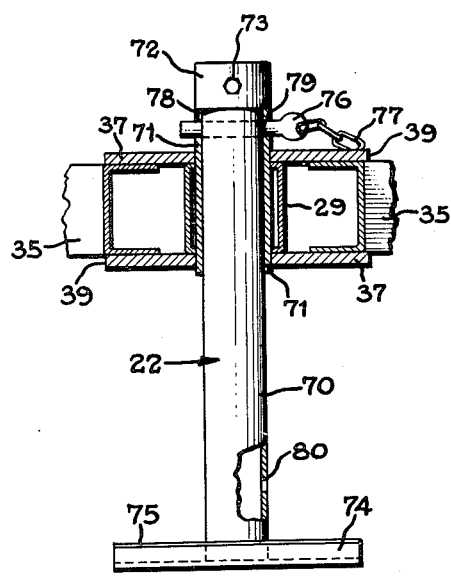
Figure 7 is a fragmentary sectional view taken on line 7—7, Figure 5, detailing the prop in its mounting.

When the trailer has been inclined to dumping position, the operator pulls the latch pin 76 from the aligned bores in the leg and the bearing bushing and the prop drops to the position shown in Figures 3 and 7 where it is latched. Thus, when the air pressure is relieved and the front end of the trailer is lowered, the prop will come into engagement with the ground before the front end of the trailer is fully lowered. In view of the leverages imposed and the tendency of the coupling frame to become aligned with the trailer frame under the weight of the trailer, the forward end of the coupling frame will become elevated with respect to the coupling pin and the vehicles will be unhitched. The air line is then disconnected from the tractor and the vehicles are fully separated. The coupling member includes coupling means which will be described hereinafter.

Figure 5:
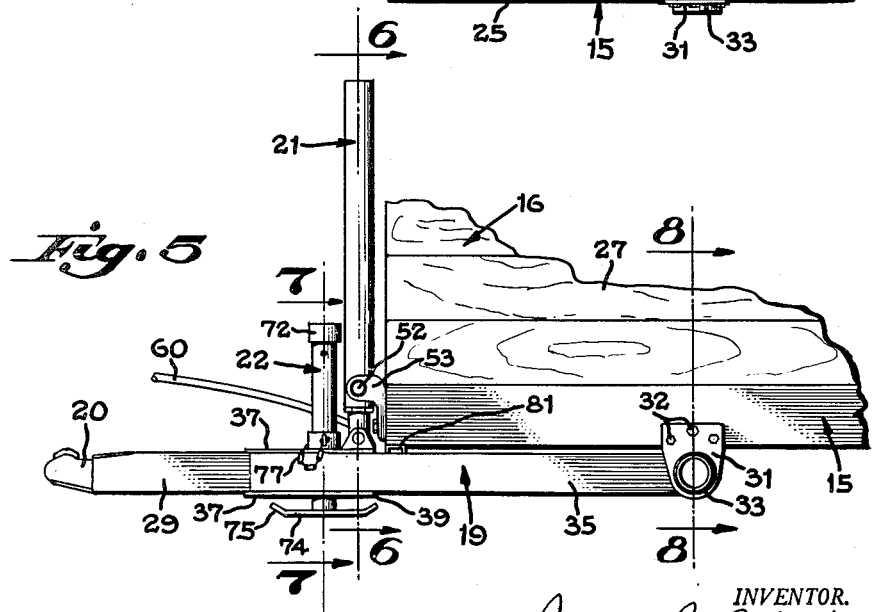
Figure 5 is a fragmentary side view of Figure 4 additionally illustrating the supporting mechanism and the fluid operated piston and cylinder mechanism for dumping the trailer.

Thus, it will be seen that the air hoist may be used for uncoupling, for dumping the trailer or for a combination of dumping and uncoupling. In order to properly space the trailer frame and the coupling frame when the trailer frame is fully supported on the coupling frame, an inverted channel 81 constituting a spacer (Figure 5) is disposed across the underside of the forward edge of the trailer frame. This member constitutes an abutment pad supporting the forward end of the trailer on the coupling frame in the towing or uncoupling positions of the trailer.

As shown in Figures 9 to 13 inclusive, a modified arrangement of the prop may be provided which will permit uncoupling by the operator without leaving the seat 85 of the tractor. In this instance, the prop is pivotally attached to the underside of the coupling frame by means of a pivot pin 86. The lower end of the prop leg or tube 87 has the foot or skid member 88 pivotally attached thereto. To provide the proper bearing for the prop at the upper end, a cross bearing tube 89 is welded to the upper end of the tubular leg of the prop. The pin 86 traverses this bearing tube or sleeve and is fixed in the depending flanges or arms 91 of a support bracket 92 fixed to the underside of the tongue 29 (Figure 12). The lower end of the prop includes a similar bearing tube 93 mounted on a pin 94 fixed in the upwardly turned side flanges 95 of the skid 88. Thus, when the prop is retracted, the skid element (due to the position of the pivot therefor unbalancing the skid) will adjust to the position shown so as to permit full retraction of the prop against the underside of the trailer frame.

A lug 96 projects forwardly from an intermediate point on the prop and an actuator or connecting link 97 has its articulated arms 98 straddling this lug and secured thereto by means of a pivot pin 99. The forward end of this connecting link is pivotally attached to a prop actuating lever 100. Specifically, it has its forward end disposed between the articulated arms 101 of the lower arm of the lever and is secured thereto by means of a pin 102. The lever is pivoted on the tongue towards its lower end by means of a pivot pin 103. The actuator lever has a portion 104 turned angularly forwardly which normally lies just above the coupling means. This portion constitutes the handle, and actuation is brought about by raising the handle and swinging it to the position shown in Figure 10 wherein the prop is lowered. This handle or actuating lever is held in position for holding the prop in upper retracted position by means of a latch 105 (Figure 11). A support bracket of angular form is welded to the top of the tongue, this bracket being indicated at 106. The latch is pivoted in the cross flange of this bracket by means of a pin 108, the latch, therefore, swinging crosswise to the path of lever movement. The latch includes a notch 109, engageable upon lateral throw, with an abutment member 110 fixed to the side of the operating lever.

The coupling means per se does not form a part of this invention. Generally speaking, it consists of a socket member which was previously indicated at 20 and is adapted to receive the coupling pin 40. Means are provided for locking the socket member on the coupling pin. In the case of the modified form of the invention, an arrangement is provided, whereby the prop actuating mechanism in its prop retracted position, locks the socket member on the coupling pin. For this purpose, a locking member 111 is pivotally mounted on the coupling socket member 20 as at 112. This member is swung by means of a link 113 connected to the upper arm 114 of the member 111 and to the actuating lever 100 above its pivot pin 103. Pivot pins 115 and 116 connect the link 113 in the aforesaid manner. The member 111 includes a wedging or locking arm 117 which engages and holds the coupling pin in the socket when the prop is retracted as shown in Figure 9. When the prop is in use for supporting the forward end of the trailer, a member 111 is swung to clear the wedging or locking end thereof from contact with the coupling pin.

Having described my invention, I claim:

1. A dump trailer adapted to be coupled to a towing vehicle comprising a trailer frame having road wheels at its rearward end, a coupling frame at the forward end of the trailer frame, the coupling frame having a forward extension which projects for a substantial extent beyond the forward end of the trailer frame and a rearward portion which extends a substantial distance rearwardly beneath the trailer frame, a universal joint element mounted upon the forward end of the coupling frame adapted to provide a draft connection with a cooperating universal joint element mounted on a towing vehicle, pivot bearings at the rearward end of the coupling frame pivotally connected to the trailer frame, the bearings being disposed beneath the trailer frame on a line which is located rearwardly from the forward end of the trailer frame and forwardly from said road wheels, the trailer frame being supported when in lowered position by engagement of its forward portion upon the rearward portion of the coupling frame, whereby the weight load of the forward portion of the trailer frame is imposed by the coupling frame upon the universal joint element with the rearward end supported by said road wheels, a cylinder rising vertically from the forward end of the trailer frame having its lower end pivotally connected thereto, a piston slidable within said cylinder having its lower end pivotally connected to the coupling frame at a point intermediate the length of the coupling frame, and means for supplying fluid pressure to said cylinder whereby the piston and cylinder are effective to force apart the trailer frame and coupling frame causing angulation of the coupling frame about the universal joint element and pivot bearings in a direction to raise the forward end of the trailer frame and provide a dumping angle, the coupling frame by its forward extension providing a motion increasing lever which is effective to raise the trailer frame a distance greater than the stroke of the piston and thereby increase the dumping angle.

2. A dump trailer adapted to be coupled to a towing vehicle comprising a trailer frame having road wheels at its rearward end, a coupling frame consisting of a pair of rearwardly diverging limbs disposed beneath the forward end of the trailer frame and having a tongue joined to said limbs and extending forwardly for a substantial extent beyond the forward end of the trailer frame, a universal joint element mounted upon the forward end of the tongue adapted to provide an articulated draft connection with a cooperating universal joint element of a towing vehicle, a pivot bearing at the rearward end of each of the diverging limbs pivotally connecting the same to the opposite sides of the trailer frame, the bearings being disposed beneath the trailer frame on a line which is located rearwardly from the forward end of the trailer frame and forwardly from said road wheels, the trailer frame being supported, when in lowered position by direct engagement of its forward portion upon the diverging limbs with the weight load imposed by the diverging limbs and tongue upon the universal joint element with the rearward end supported by said road wheels, a cylinder rising vertically from the forward end of the trailer frame having its lower end pivotally connected thereto, a piston slidable within said cylinder having its lower end pivotally connected to the coupling frame at a point intermediate the universal joint element and pivot bearings, and means for supplying fluid pressure to said cylinder whereby the piston and cylinder are effective to force apart the trailer frame and coupling frame causing angulation of the coupling frame about the universal joint element and spaced bearings in a direction to raise the forward end of the trailer frame and provide a dumping angle, the coupling frame by its forward tongue extension providing a motion increasing lever which is effective to raise the trailer frame a distance greater than the stroke of the piston and thereby increase the dumping angle.

3. A dump trailer adapted to be coupled to a towing vehicle comprising a trailer frame having road wheels at its rearward end, a coupling frame disposed beneath the forward end of the trailer frame, the coupling frame having a forward extension which projects for a substantial extent beyond the forward end of the trailer frame, a universal joint element mounted upon the forward end of the coupling frame adapted to provide an articulated draft connection with a cooperating universal joint element of a towing vehicle, pivot bearings connecting the rearward end of the coupling frame to the trailer frame, the bearings being disposed beneath the trailer frame, the trailer frame being supported, when in lowered position, by direct engagement of its forward portion upon the coupling frame whereby the weight load is imposed by the coupling frame upon the universal joint element with the rearward end supported by said road wheels, a prop structure for supporting the forward end of the trailer frame when the same is uncoupled from the towing vehicle, said prop comprising a leg mounted at a point intermediate the length of the coupling frame, the leg being movable from a lower support position to an upper position of non-use, and having means for locking the same selectively in said positions, power means mounted upon the forward end of the trailer frame having an actuating element pivotally connected to the coupling frame at a point intermediate the length of the coupling frame, the power means being effective to force apart the coupling frame and trailer frame causing angulation of the coupling frame about the universal joint element and pivot bearings in a direction to raise the forward end of the trailer frame and providing a dumping angle, the coupling frame by its forward extension providing a motion increasing lever which is effective to raise the trailer frame a distance greater than the movement provided by said power means, said prop adapted to be lowered to said support position when the coupling frame is angulated and thereby adapted to engage the ground and raise the universal joint element out of engagement with the universal joint element of the towing vehicle when the power means is actuated to lower the trailer frame from said dumping angle.

4. A dump trailer adapted to be coupled to a towing vehicle comprising a trailer frame having road wheels at its rearward end, a coupling frame disposed beneath the forward end of the trailer frame, the coupling frame having a forward extension which projects for a substantial extent beyond the forward end of the trailer frame, a universal joint element mounted upon the forward end of the coupling frame adapted to provide an articulated draft connection with a cooperating universal joint element of a towing vehicle, the universal joint element having a locking member, pivot bearings at the rearward end of the coupling frame pivotally connecting the rearward end to the trailer frame, the trailer frame being supported when in lowered position by engagement of its forward portion upon the coupling frame whereby the weight load is imposed by the coupling frame upon the universal joint element with the rearward end supported by said road wheels, a prop for supporting the forward end of the trailer when the same is uncoupled from the towing vehicle, said prop comprising a leg mounted at a point intermediate the length of the coupling frame, the leg being movable from a lowered support position to a raised position of non-use, a hand lever having a connection to said prop and to the locking member of the universal joint element effective to lower the prop and release the universal joint element, power means mounted upon the forward end of the trailer frame having an actuating element pivotally connected to the coupling frame at a point intermediate the length of the coupling frame, the power means being effective to force apart the coupling frame and trailer frame causing angulation of the coupling frame about the universal joint element and pivot bearings in a direction to raise the forward end of the trailer frame and providing a dumping angle, the universal joint adapted to be released and the prop adapted to be lowered to said support position by the hand lever when the coupling frame is angulated whereby the prop engages the ground and raises the universal joint element out of engagement with the universal joint element of the towing vehicle when the power means is actuated to lower the trailer frame from said dumping angle.

JAMES J. BLACK.

REFERENCES CITED

The following references are of record in the file of this patent:

UNITED STATES PATENTS

| Number | Name | Date |
|---|---|---|
| 649,925 | Fisher | May 22, 1900 |
| 1,373,000 | Gilbert et al. | Mar. 29, 1921 |
| 1,390,122 | Gilbert et al. | Sept. 6, 1921 |
| 1,488,267 | Meyers | Mar. 25, 1924 |
| 1,709,364 | Nelson | Apr. 16, 1929 |
| 1,894,320 | Muchenberger-Wittlinger | Jan. 17, 1933 |
| 1,925,296 | Barrett | Sept. 5, 1933 |
| 2,027,098 | Helms | Jan. 7, 1936 |
| 2,034,674 | Edwards | Mar. 17, 1936 |
| 2,045,647 | Helms | June 30, 1936 |
| 2,113,448 | Hewitt | Apr. 5, 1938 |
| 2,225,157 | Court | Dec. 17, 1940 |
| 2,332,326 | Lex | Oct. 19, 1943 |
| 2,465,244 | Lutz | Mar. 22, 1949 |
| 2,474,483 | Luttrell | June 28, 1949 |
| 2,491,417 | Pflantz et al. | Dec. 13, 1949 |

FOREIGN PATENTS

| Number | Country | Date |
|---|---|---|
| 10,426 | Great Britain | Sept. 3, 1885 |